US006006342A

United States Patent [19]
Beardsley et al.

[11] Patent Number: 6,006,342
[45] Date of Patent: Dec. 21, 1999

[54] FAILOVER AND FAILBACK SYSTEM FOR A DIRECT ACCESS STORAGE DEVICE

[75] Inventors: Brent C. Beardsley; Micheal T. Benhase, both of Tucson, Ariz.

[73] Assignee: International Business Machines Corporation, Armonk, N.Y.

[21] Appl. No.: 08/988,887

[22] Filed: Dec. 11, 1997

[51] Int. Cl.$^6$ .................................................. G06F 11/00
[52] U.S. Cl. ............................................................ 714/5
[58] Field of Search ................................. 714/5, 6, 7, 8, 714/9, 10, 13; 711/114, 120, 162; 370/220, 226

[56] References Cited

U.S. PATENT DOCUMENTS

| | | |
|---|---|---|
| 4,916,605 | 4/1990 | Beardsley et al. . |
| 5,136,498 | 8/1992 | McLaughlin et al. . |
| 5,303,244 | 4/1994 | Watson . |
| 5,426,774 | 6/1995 | Banerjee et al. . |
| 5,437,022 | 7/1995 | Beardsley et al. . |
| 5,530,852 | 6/1996 | Meske, Jr. et al. . |
| 5,559,764 | 9/1996 | Chen et al. . |
| 5,636,359 | 6/1997 | Beardsley et al. . |
| 5,640,530 | 6/1997 | Beardsley et al. . |
| 5,682,509 | 10/1997 | Kabenjian . |
| 5,768,623 | 6/1998 | Judd et al. .................................. 714/5 |
| 5,870,537 | 2/1999 | Kern et al. .................................. 714/6 |

OTHER PUBLICATIONS

Author Nolta, A. H; Reed, D.G.; Tayler, G. E IBM Corp. Managing Memory–To–DASD Data Recording, Apr. 1983.
Memory Space Mapping Using Virtual Addressing To Multiple–Sized Memory Units IBM, Aug. 1975.
David A. Patterson, et al., "A Case for Redundant Arrays of Inexpensive Disks (RAID)", *SIGMOD Record, ACM Press*, vol. 17, No. 3, Sep. 1988, pp. 109–116.

"Shared Disk, UNIX–Based, Cluster File System", *IBM Technical Disclosure Bulletin*, vol. 37, No. 06B, Jun. 1994, pp. 209–210.

*Primary Examiner*—Robert W. Beausoliel, Jr.
*Assistant Examiner*—Pierre Eddy Elisca
*Attorney, Agent, or Firm*—David W. Victor; Konrad Raynes & Victor

[57] ABSTRACT

Disclosed is a system for handling failures in a storage controller interfacing between a plurality of host systems and direct access storage devices (DASDs). The storage controller directs data from the host systems through a first and second data paths in the storage controller to a DASD. A first processor, first non-volatile memory unit (NVS), and a first cache are associated with the first data path and a second processor, a second NVS, and a second cache are associated with the second data path. A bridge provides communication between the first processor and the second NVS and the second processor and the first NVS. During normal operations prior to a failure in the storage controller, data directed to the first data path is written in the first cache and communicated with the first processor to the second NVS via the bridge for storage in the second NVS. Data directed to the second data path is written in the second cache and communicated with the second processor to the first NVS via the bridge for storage in the first NVS. A point of failure within at least one of the first processor, first cache, and first NVS is handled by routing the data directed to the first data path to the second processor and writing the routed data to the second cache and the second NVS. Upon repairing the point of failure, the data directed to the first data path is rerouted to the first processor, wherein the rerouted data is written in the first cache and communicated with the first processor to the second NVS via the bridge for storage therein.

26 Claims, 12 Drawing Sheets

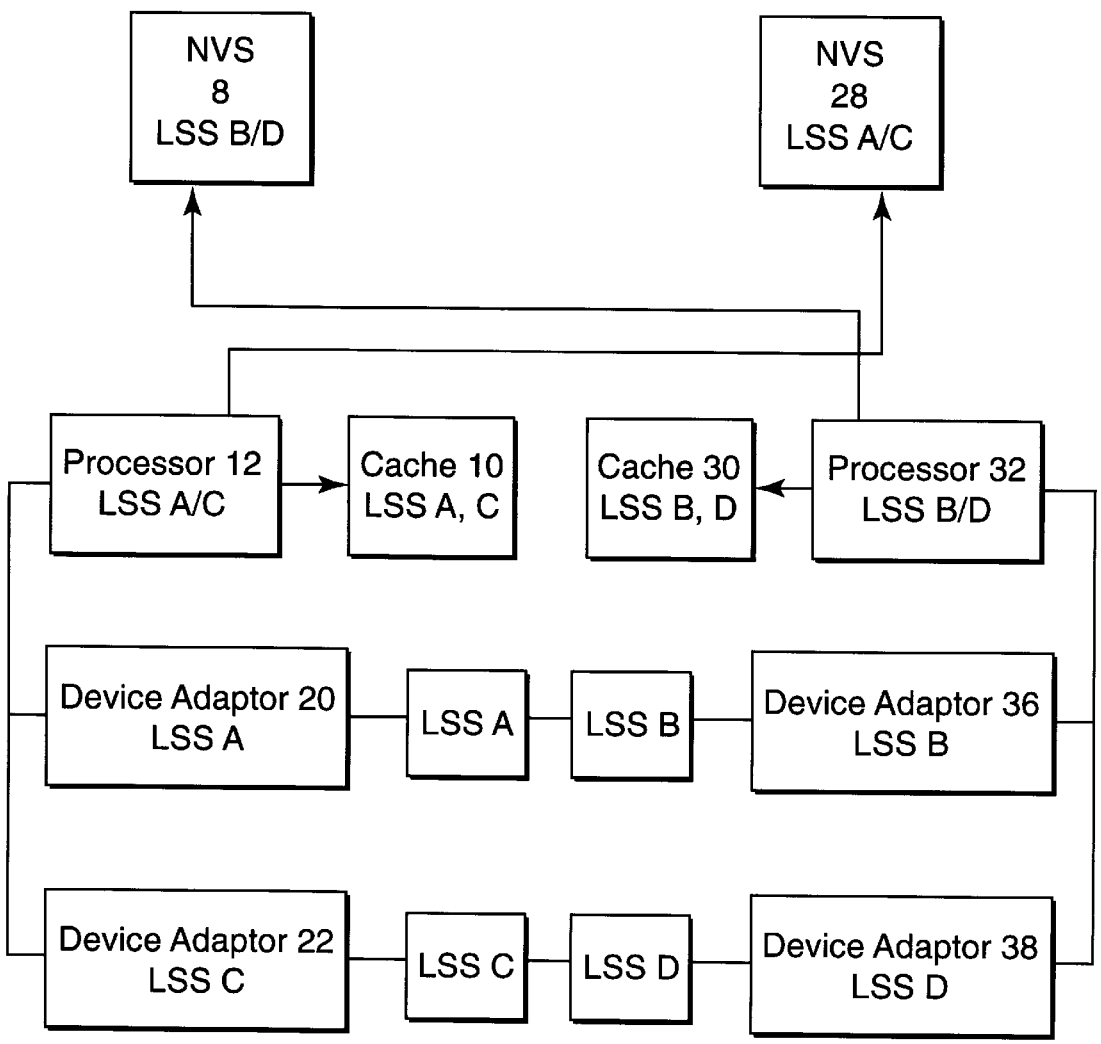

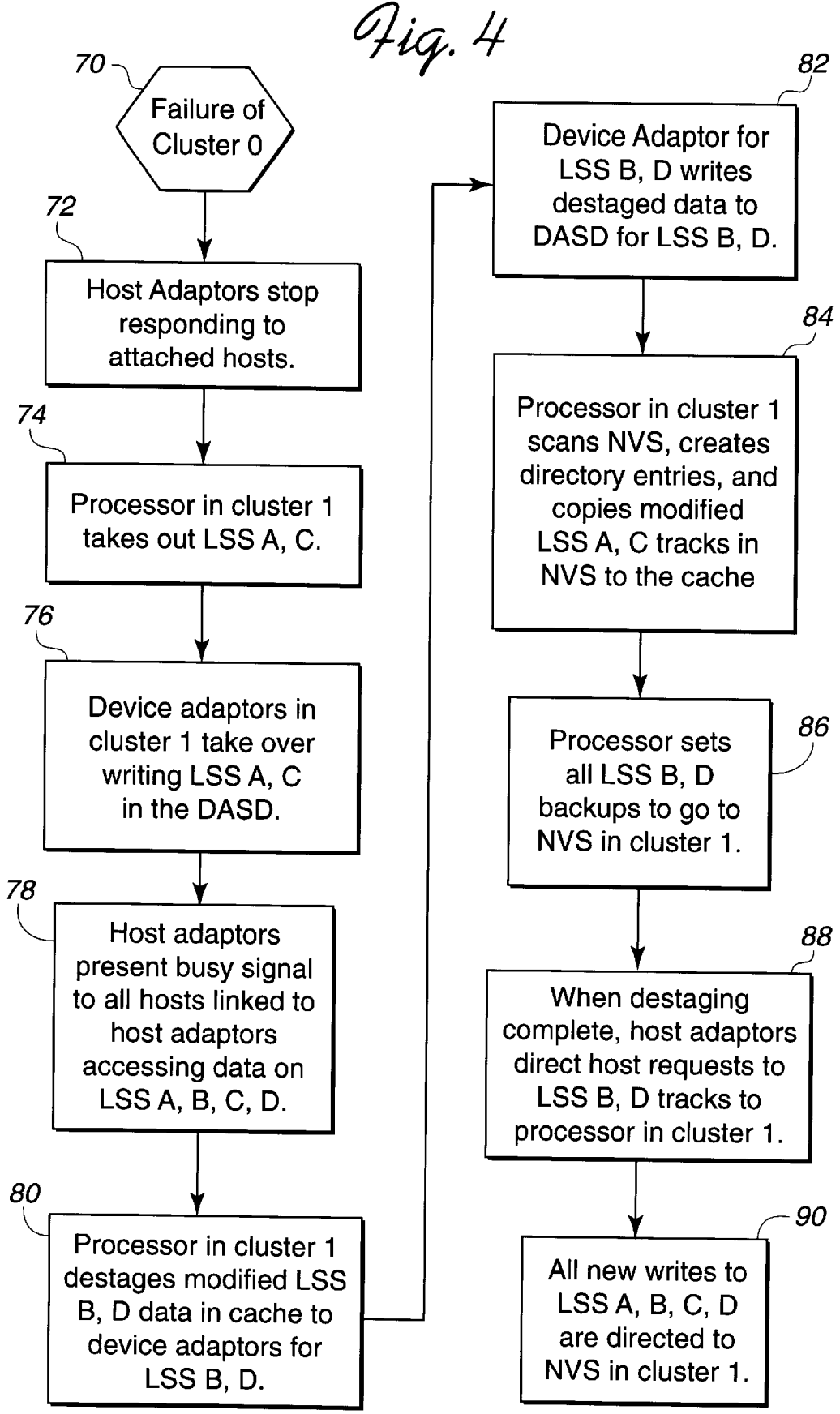

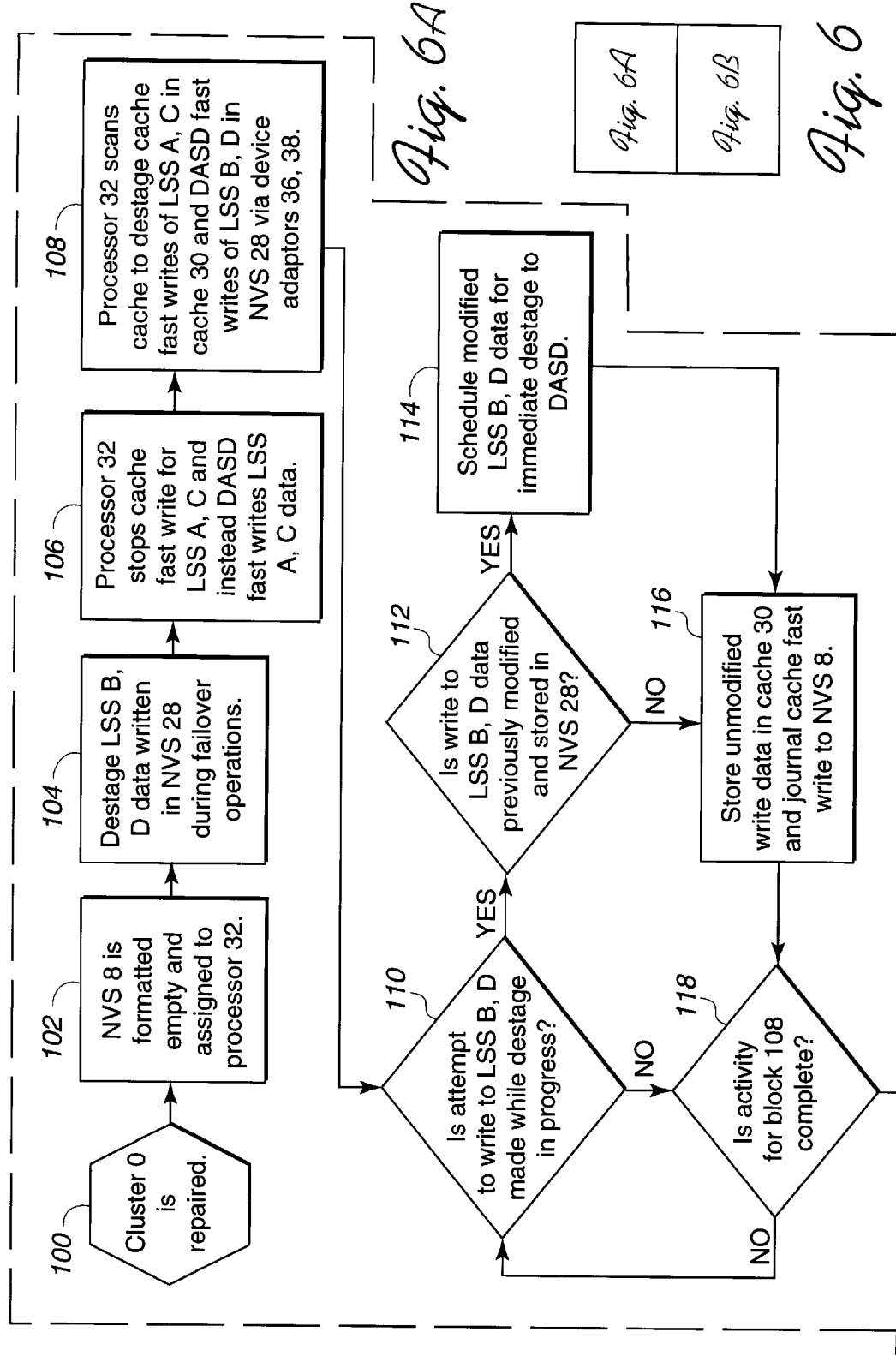

FAILOVER AND FAILBACK SYSTEM FOR A DIRECT ACCESS STORAGE DEVICE

BACKGROUND OF THE INVENTION

1. Field of the Invention

The present invention relates to a storage controller for interfacing between a host system and a direct access storage device (DASD) system and, in preferred embodiments, a storage controller including a failback and failover system for handling a point of failure within the storage controller.

2. Description of the Related Art

In a large distributed computer system, a plurality of host computers and devices are typically connected to a number of direct access storage devices (DASDs) comprised of hard disk drives (HDDs). The DASDs may be organized in a redundant array of independent disks, i.e., a RAID array. A RAID array is comprised of multiple, independent disks organized into a large, high-performance logical disk. A controller stripes data across the multiple disks in the array and accesses the disks in parallel to achieve higher data transfer rates. However, utilizing multiple disks in an array increases the risk of failure. The solution in the art is to employ redundancy in the form of error-correcting codes to tolerate disk failures. The arrangement and organization of RAID arrays is described in Peter M. Chen, Edward K. Lee, Garth A. Gibson, Randy H. Katz, and David A. Patterson, "RAID: High-Performance, Reliable Secondary Storage," ACM Computing Surveys, Vol. 6, No. 2, June 1994, which is incorporated herein by reference in its entirety.

Not only is there a risk associated with the failure of a hard disk drive in a DASD system such as a RAID array, but there is also a risk of failure at a point within a storage controller which controls read and write operations between host computers and the DASDs. The conventional storage controller is typically designed to handle hardware failures. One such storage control designed to handle certain hardware failures is the storage controller utilized in the International Business Machines Corporation's (IBM) 3990 Model 3 system. This storage controller has two storage clusters, each of which provides for selective connection between a host computer and a DASD. Each cluster is on a separate power boundary. Further, a non-volatile storage unit (NVS) is associated with each cluster. The NVS is a memory array supported by a battery backup system. The NVS stores back-up copies of modified data in the event of a hardware failure within the storage controller while data is being written to a DASD. The NVS provides a storage back-up that is as secure as writing the data to a magnetic disk. Failback systems for storage controllers are described in U.S. Pat. Nos. 5,636,359, 5,437,022, 5,640,530, and 4,916,605, all of which are assigned to IBM, the assignee of the subject application, and all of which are incorporated herein by reference in their entirety.

In U.S. Pat. Nos. 5,437,022 and 5,640,530, as with the IBM 3990, model 3, the storage controller is comprised of two clusters, wherein each cluster has a cache and a NVS. The cache buffers frequently used data. When a request is made to write data to a DASD attached to the storage controller, the storage controller may cache the data and delay writing the data to a DASD. Caching data can save time as writing operations involve time consuming mechanical operations. The cache and NVS in each cluster can intercommunicate, allowing for recovery and reconfiguration of the storage controller in the event that one of the memory elements is rendered unavailable. For instance, if one cluster and its cache fails, the NVS in the other cluster maintains a back-up of the cache in the failed cluster.

In one caching operation, referred to as DASD fast write, data buffered in the cache is backed-up in the NVS. Thus, two copies of data modifications are maintained, one in the cache and another in the NVS. DASD fast write is typically used for data that will be written to the DASD. If the data to be written to the DASD is present in the cache, instead of writing the data to the DASD, the controller copies the data into the cache and NVS without having to interrupt processing to immediately write to the DASD. If the data to be written is not present in the cache, then the data is written to the DASD and cache simultaneously and immediately. Another caching operation, referred to as cache fast write, involves writing data to the cache without using the NVS. Cache fast write is intended for data that is not needed for job completion or that can be easily reconstructed.

Notwithstanding, the storage controller disclosed in U.S. Pat. Nos. 5,437,022 and 5,640,530 comprises a complex and custom hardware structure, wherein each storage path in a cluster requires its own custom microcontroller and microcode. In fact, U.S. Pat. No. 5,640,530, at column 6, lines 50–57, makes note of the added complexity of the system which requires that each microcontroller maintains and updates information concerning the location of data for read, writes and other data transfers.

Moreover, data transfer rates in a storage controller are determined by the data-transfer rates at each connectivity point within the controller. The speed at which processed data travels between a host and DASDs, such as a RAID array, is restricted by the maximum data-transfer rate possible through each peripheral interface. In current systems, data transfer rates are significantly degraded when a cluster fails, because the remaining cluster must then handle all data transfers. In storage control systems which involve complex arrangements to handle failovers, such as the system disclosed in U.S. Pat. Nos. 5,437,022 and 5,640,530, the complexity of the system can further degrade data transfer rates when one cluster must take over data transfers previously handled by the failed clusters.

Yet further, in some prior art systems, the NVS and storage controller have single points of failure which can disable the entire cache and NVS, resulting in substantial performance degradation.

SUMMARY OF THE INVENTION

To address the shortcomings in the prior art described above, preferred embodiments of the present invention provide a system for handling failures in a storage controller interfacing between a plurality of host systems and direct access storage devices (DASDs). The storage controller directs data from the host systems through first and second data paths in the storage controller to a DASD. A first processor, first non-volatile memory unit (NVS), and a first cache are associated with the first data path and a second processor, a second NVS, and a second cache are associated with the second data path. A bridge provides communication between the first processor and the second NVS and the second processor and the first NVS.

During normal operations prior to a failure in the storage controller, data directed to the first data path is written in the first cache and communicated with the first processor to the second NVS via the bridge for storage in the second NVS. Data directed to the second data path is written in the second cache and communicated with the second processor to the first NVS via the bridge for storage in the first NVS. A point of failure within at least one of the first processor, first cache, and first NVS is handled by routing the data directed to the first data path to the second processor and writing the routed data to the second cache and the second NVS. Upon repairing the point of failure, the data directed to the first data path is rerouted to the first processor, wherein the rerouted data is written in the first cache and communicated with the first processor to the second NVS via the bridge for storage therein.

It is an object of the present invention to provide a storage controller including a first and second data paths to direct data from host systems and DASDs, wherein a processor, cache and NVS are associated with each data path.

It is a further object that the NVS in the first data path back-up data transfers through the second data path in case a component within the second data path fails.

It is yet a further object to provide improved methods for handling hardware failures within the first data path and for failing back to the first data path after the hardware failure has been repaired, such that no single point of failure will incapacitate the entire storage controller.

It is still a further object that common components be used for the processor, NVS, and cache to minimize the complexity of the storage controller.

BRIEF DESCRIPTION OF THE FIGURES

Referring now to the drawings in which like reference numbers represent corresponding parts throughout:

FIG. 3 illustrates a block diagram of how the storage controller embodiment of FIG. 1 handles data writes to logical subsystems within the DASDs during normal operations;

FIG. 4 is a flowchart that illustrates general logic implemented within the storage controller to handle a failure of a hardware component within the storage controller in accordance with a preferred embodiment of the present invention;

FIGS. 6a and 6b show a flowchart that illustrate general logic implemented within the storage controller to failback after the failed hardware component has been repaired in accordance with a preferred embodiment of the present invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment and Architecture of the Storage Controller

Figure 1:
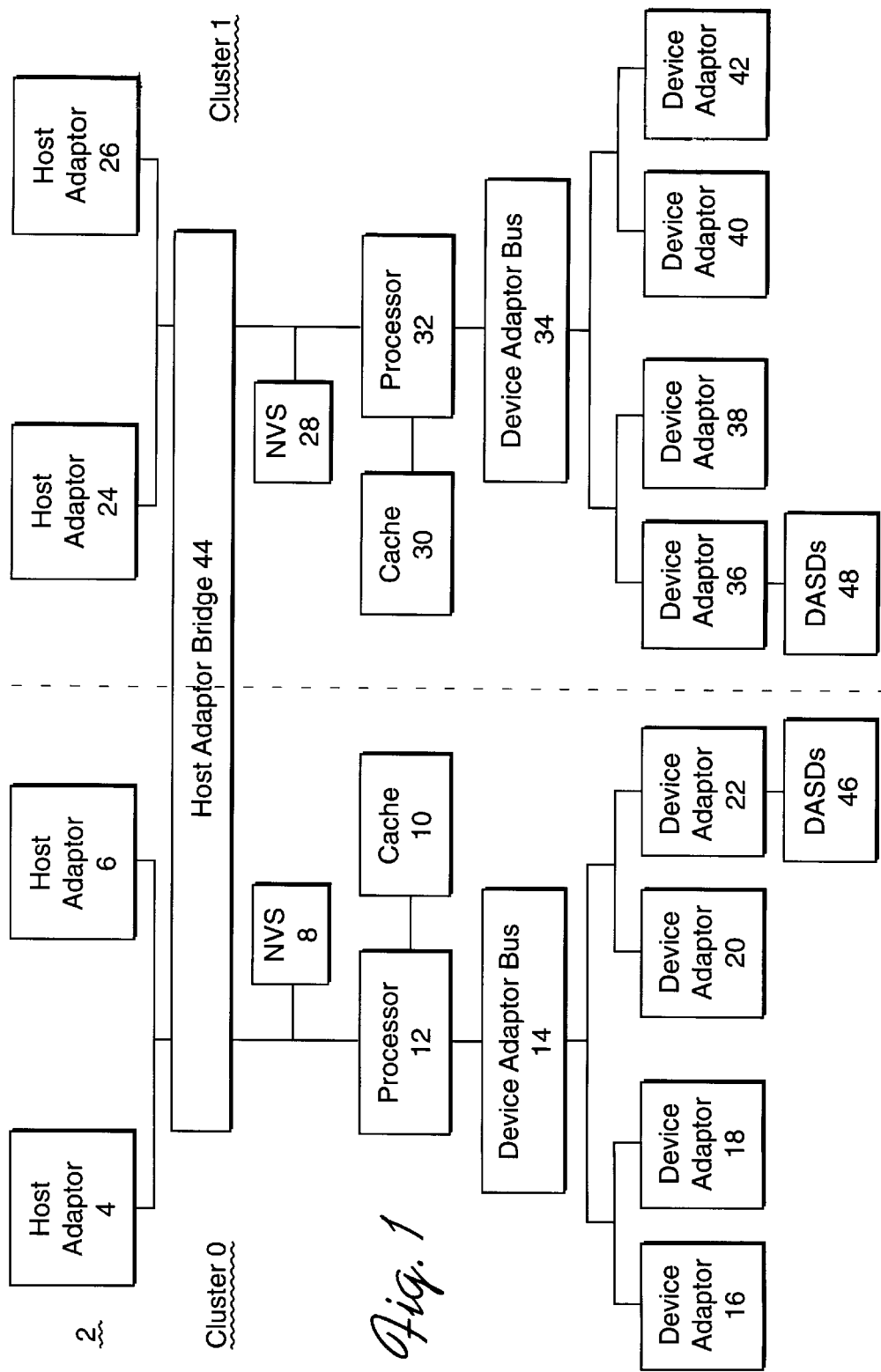
FIG. 1 illustrates a block diagram of the components and architecture of a preferred embodiment of a storage controller in accordance with the present invention.

FIG. 1 illustrates a block diagram of the components and architecture of a preferred embodiment of a storage controller 2 which interfaces between host computers or devices (not shown) and DASDs 46, 48, which include multiple RAID arrays. In preferred embodiments, the DASDs are magnetic storage units such as hard disk drives. The host computers and devices are connected to host adaptors 4, 6, 24, 26 via a bus interface (not shown), such as a SCSI bus interface. The host adaptors 4, 6, 24, 26 may be comprised of an Enterprise System Connection (ESCON) adaptor which provides access to ESCON channels and connections. Each host adaptor 4, 6, 24, 26 may be comprised of a series of host adaptors which connect to a host system.

In preferred embodiments, the storage controller 2 is divided into two clusters, cluster 0 and cluster 1. Cluster 0 consists of host adaptors 4, 6, a non-volatile storage unit (NVS) 8, a cache 10, a processor 12, a device adaptor bus 14, device adaptors 16, 18, 20, 22. Cluster 1 consists of host adaptors 24, 26, an NVS 28, a cache 30, a processor 32, a device adaptor bus 34, and device adaptors 36, 38, 40, 42. A host adaptor bridge 44 interfaces the components of cluster 0 with cluster 1. The host adaptors 4, 6, 24, 26 are connected to the host adaptor bridge 44. In preferred embodiments, the bridge 44 is a dual master bus which may be controlled by one of the processors 12, 32 or one of the host adaptors 4, 6, 24, 26. In further embodiments, the host adaptor bridge 44 may include bridge technology to allow the bus to operate at its own clock speed and provide a buffer to buffer data transferred across the bridge 44. The bridge 44 interconnects the host adaptors 4, 6, 24, 26 with the processors 12, 32. In preferred embodiments the processors 12, 32 are symmetrical multi-processors, such as the IBM RS/6000 processor. Each processor 12, 32 maintains information on the configuration of the other cluster in order to reroute data transfers directed toward the other cluster.

The caches 10, 30 may be external to the processors 12, 32 or included in the processor 12, 32 complex. A processor 12, 32 in one cluster can communicate with the other processor, NVS 8, 28 and cache 10, 30 in the other cluster via the host adaptor bridge 44. In preferred embodiments, the NVS 8, 28 consists of a random access electronic storage with a battery backup. Storage time for a fully charged battery may last a couple of days. In preferred embodiments, the NVS battery is continuously charged whenever primary power is applied during normal operations. The battery will supply power necessary to maintain contents of the NVS 8, 28 intact until power is restored. The cache 10, 30, on the other hand, is a volatile storage unit that cannot maintain data in the event of a power failure.

Figure 2:
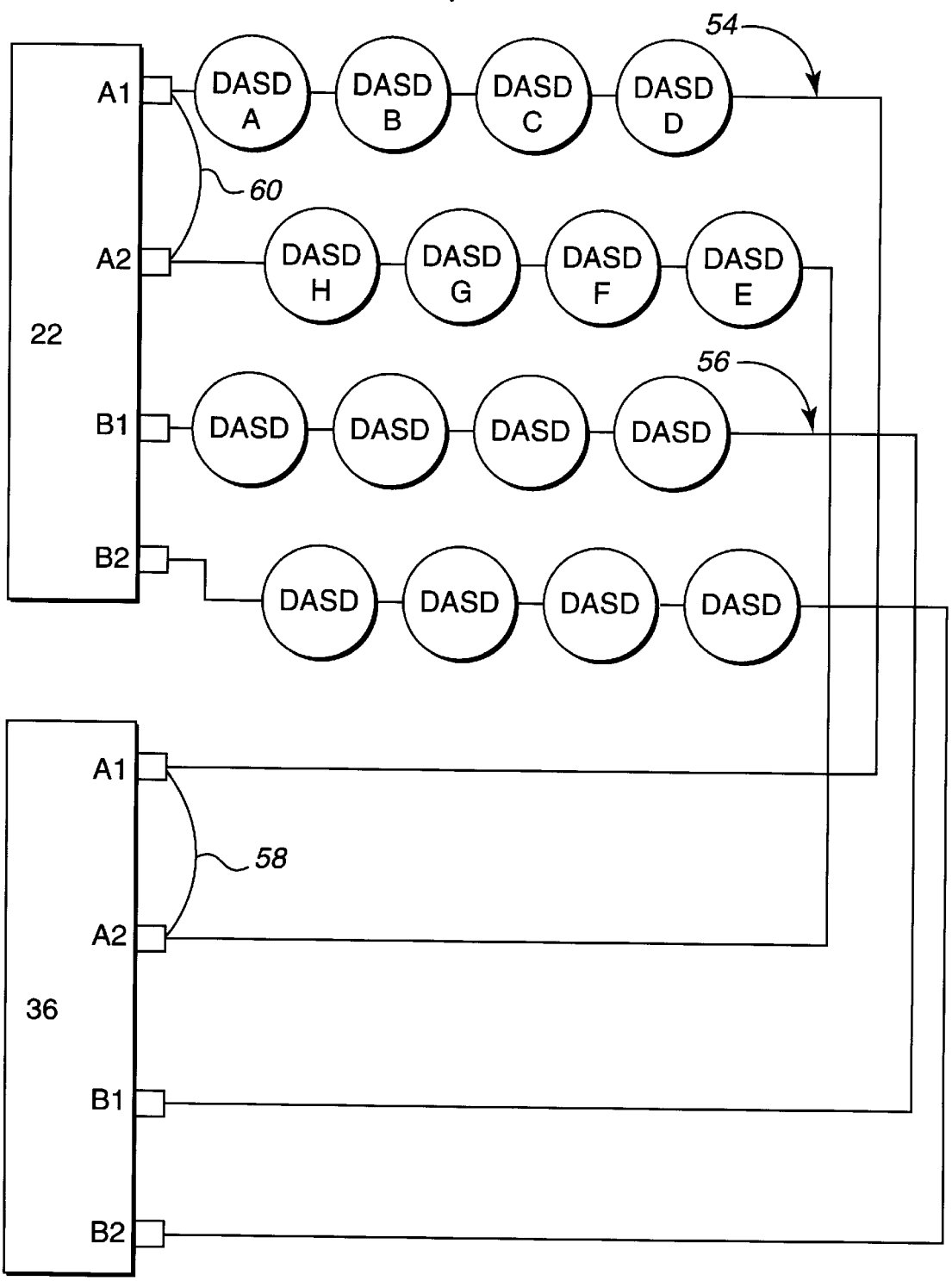
FIG. 2 illustrates a block diagram of a preferred embodiment of the arrangement of DASDs and their attachment to components of the storage controller in accordance with the present invention.

Device adaptor bus 14 interconnects the processor 12 with the device adaptors 16, 18, 20, 22 and device adaptor bus 34 interconnects processor 32 with device adaptors 36, 38, 40, 42. The device adaptors 16, 18, 20, 22, 36, 38, 40, 42 interface between the storage controller and the DASDs, or RAID array of hard disk drives. In preferred embodiments, the device adaptors 16, 18, 20, 22, 36, 38, 40, 42 employ the Serial Storage Architecture (SSA) developed by IBM. In such case, the DASDs may be interconnected in a loop topology including multiple RAID arrays. FIG. 2 shows a preferred embodiment of attaching a device adaptor 22, 36 from each cluster to a plurality of DASD devices using a loop topology. FIG. 2 shows two loops 54, 56, wherein each loop has eight DASD devices. Loop 54 follows the following path: port A1 of the device adaptor 22 to DASD A through DASD D, which then extends to port A1 of device adaptor 36, which then traverses from port A1 to A2 via line 58, through DASD E to DASD H, to port A2 of device adaptor 22, then to port A1 of device adaptor 22 via line 60. Loop 56 is formed in a similar manner using ports B1 and B2 of the device adaptors 22, 36. In this way, each loop 54, 56 is connected to a device adaptor 22, 36 from each of the clusters 0, 1. Connections to loop 54 are made via ports A1 and A2 of the device adaptors 22, 36 and to loop 56 via ports B1 and B2 of the device adaptors 22, 36. The DASDs within a loop 54, 56 are connected to each other, such that when a device adaptor 22, 36 accesses a disk within a loop 54, 56, the device adaptor 22, 36 communicates through the intermediary DASDs between the device adaptor 22, 36 and the DASD to be accessed. Thus, if a DASD in a loop 54, 56 or device adaptor 22, 36 fails, the DASDs may always be reached via another port or device adaptor. Moreover, the device adaptors 22, 36 may intercommunicate via the lines interconnecting the DASDs. If a device adaptor 22, 36 has a failure and cannot communicate with a DASD in the loop 54, 56, then the failed device adaptor 22, 36 could signal the functioning device adaptor 30 to access the DASD. Thus, rerouting can occur at the device adaptor level if one device adaptor connected to the loop fails.

In alternative embodiments, a loop 54, 56 of disks could include more or less DASD devices than shown in FIG. 2. Moreover, the topology of the arrangement of the DASD devices may differ, e.g., strings, complex switch strings, and cyclical paths. In yet further embodiments, the device adaptors may utilize different interface standards, such as SCSI. Still further, each loop 54, 56 could include multiple RAID arrays, depending on the total number of DASDs in the loop. In preferred embodiments, RAID 5 is used. In RAID 5, parity is striped uniformly over all of the disks. The advantage of RAID 5, along with RAID 1 and 3, is that the RAID array remains operational even if one disk within the RAID array fails. Different arrangements for connecting device adaptors to groups of disks are described in "A Practical Guide to Serial Storage Architecture for AIX" (IBM document SG24-4599-00, International Business Machines Corporation, copyright 1996).

By having one device adaptor from each cluster 0, 1 attached to each loop of DASDs, failure in one cluster and/or the device adaptors associated with the failed cluster will not prevent the functioning cluster from accessing the loop. Thus, no single point of failure in a cluster and/or in a device adaptor will prevent the other cluster from accessing a group of DASDs. Moreover, if a device adaptor, such as device adaptor 22, fails in a cluster that is otherwise functioning properly, then the re-routing to the other device adaptor 36 can occur at the device adaptor level. Alternatively, the failure of a device adaptor can be treated as a failure by the entire cluster, thereby transferring control over to the functioning cluster to access the DASD.

In the storage controller 2 embodiment of FIG. 1, each cluster 0, 1 has four device adaptors, wherein each device adaptor can be connected to two loops, each loop having numerous disks. Thus, the storage capacity of all DASDs attached to the clusters is significant. Each group, or loop, of DASDs attached to a device adaptor 16, 18, 20, 22, 36, 38, 40, 42 includes multiple logical volumes. For memory management purposes, the logical volumes or storage space available in the DASDs attached to a device adaptor can be segregated into logical subsystems (LSS). These LSSs are presented to a host. A device adaptor 16, 18, 20, 22, 36, 38, 40 or 42 can be associated with multiple LSSs, such that the associated device adaptor is responsible for accessing associated LSSs. As discussed, a group of DASDs attached to a pair of device adaptors, such as the loops 54, 56 of disks attached to device adaptors 24, 36 in FIG. 2, can include multiple RAID arrays. Each RAID arrays has multiple logical volumes. The logical volumes associated with a RAID array are mapped to a logical subsystem, which in turn is associated with a device adaptor. Thus, a logical subsystem represents a collection of logical volumes in a RAID array to which a pair of device adaptors are attached.

FIG. 3 is a block diagram illustrating how the storage controller 2 handles four logical subsystems, LSS A, B, C, D, each of which are associated with a pair of device adaptors. For illustrative purposes, device adaptors 20, 22, 36, and 38 are considered. However, the arrangement described with respect to FIG. 3 could apply to the other device adaptors 16, 18, 40, 42 and other LSS arrangements. Each LSS A, B, C, D is comprised of a group of logical volumes within the DASDs. For instance, device adaptor 20 in cluster 0 and device adaptor 36 in cluster 1 are associated with a group of DASDs having a plurality of logical volumes that for illustrative purposes are divided into two logical subsystems, LSS A and LSS B. When both clusters 0, 1 are operational, LSS B is directed to device adaptor 36 in cluster 1 and LSS A is directed to device adaptor 20 in cluster 0. Similarly, device adaptor 22 in cluster 0 and device adaptor 38 in cluster 1 are associated with a group of disks having a plurality of logical volumes that for illustrative purposes are divided into logical subsystems, LSS C and LSS D. Each host adaptor 4, 6, 24, 26 is associated with at least one LSS. Thus, a host system directed to LSS A, B interfaces with host adaptor 4, 6 in cluster 0. In normal operations, modified data stored in cache 10 is backed-up to NVS 28 and modified data stored in cache 30 is backed-up to NVS 8. Thus, the NVS 8, 28 stores data from the cache 10, 30 in the other cluster.

When a host writes data to a particular LSS, the host adaptor 4, 6, 24, 26 associated with such LSS will direct the data write to the cluster which handles requests for such LSS. For instance, if a host attached to host adaptor 4 writes data to LSS A, host adaptor 4 will direct the request to the processor 12. Processor 12 will maintain a copy of the data in the cache 10 and may back-up the write data in the NVS 28 in cluster 1. In this way, the NVS 28 provides a back-up to the cache 10 if cluster 0 fails. The processor 12 will then direct any access of LSS A to device adaptor 20, which provides access to the LSS A track.

FAILOVER AND FAILBACK METHODS

Figure 5A:
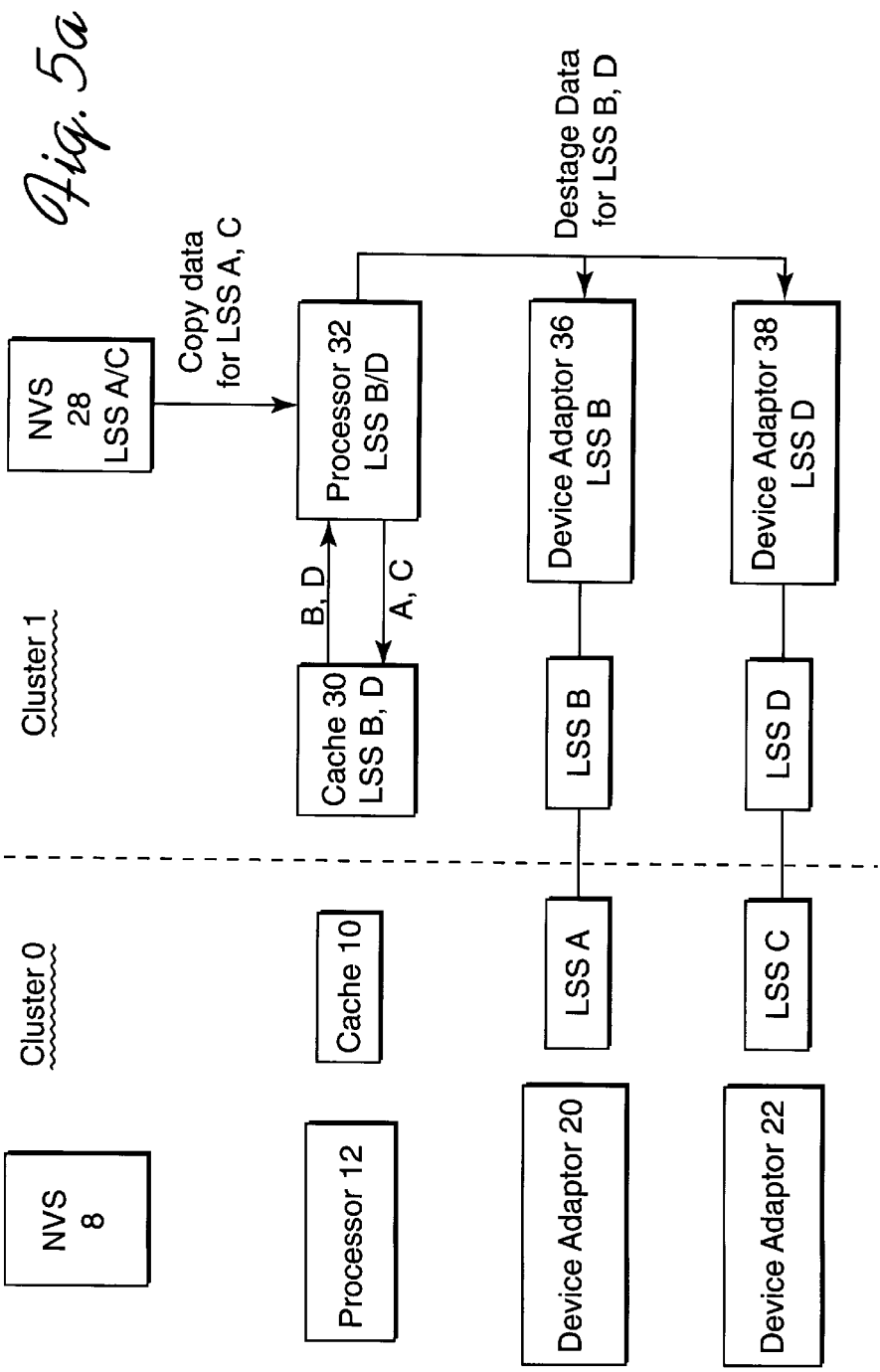
FIGS. 5a and 5b are block diagrams illustrating the storage controller embodiment of FIG. 1 handling a point of failure in accordance with the preferred logic illustrated in FIG. 4.
Figure 5B:
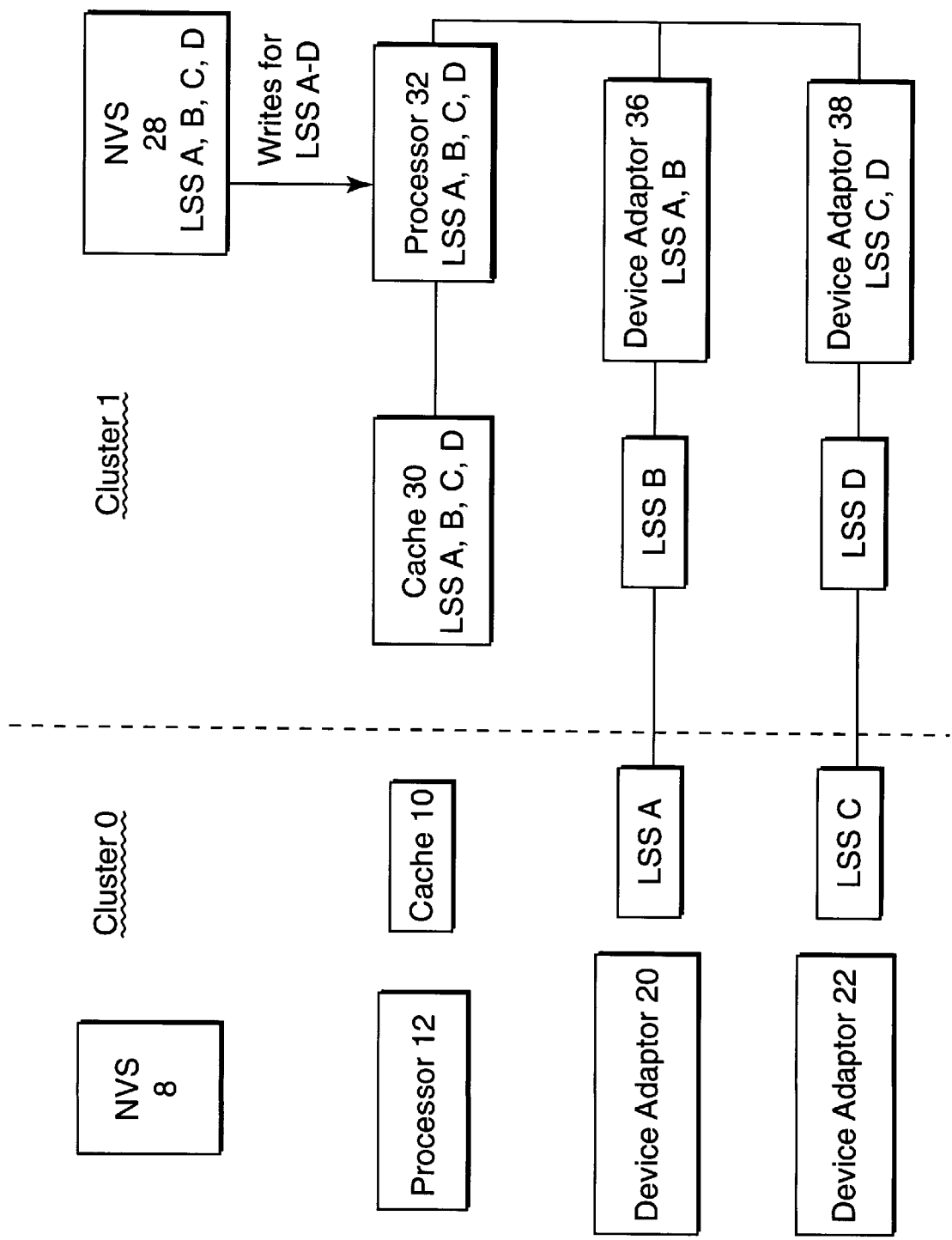
Figure 6B:
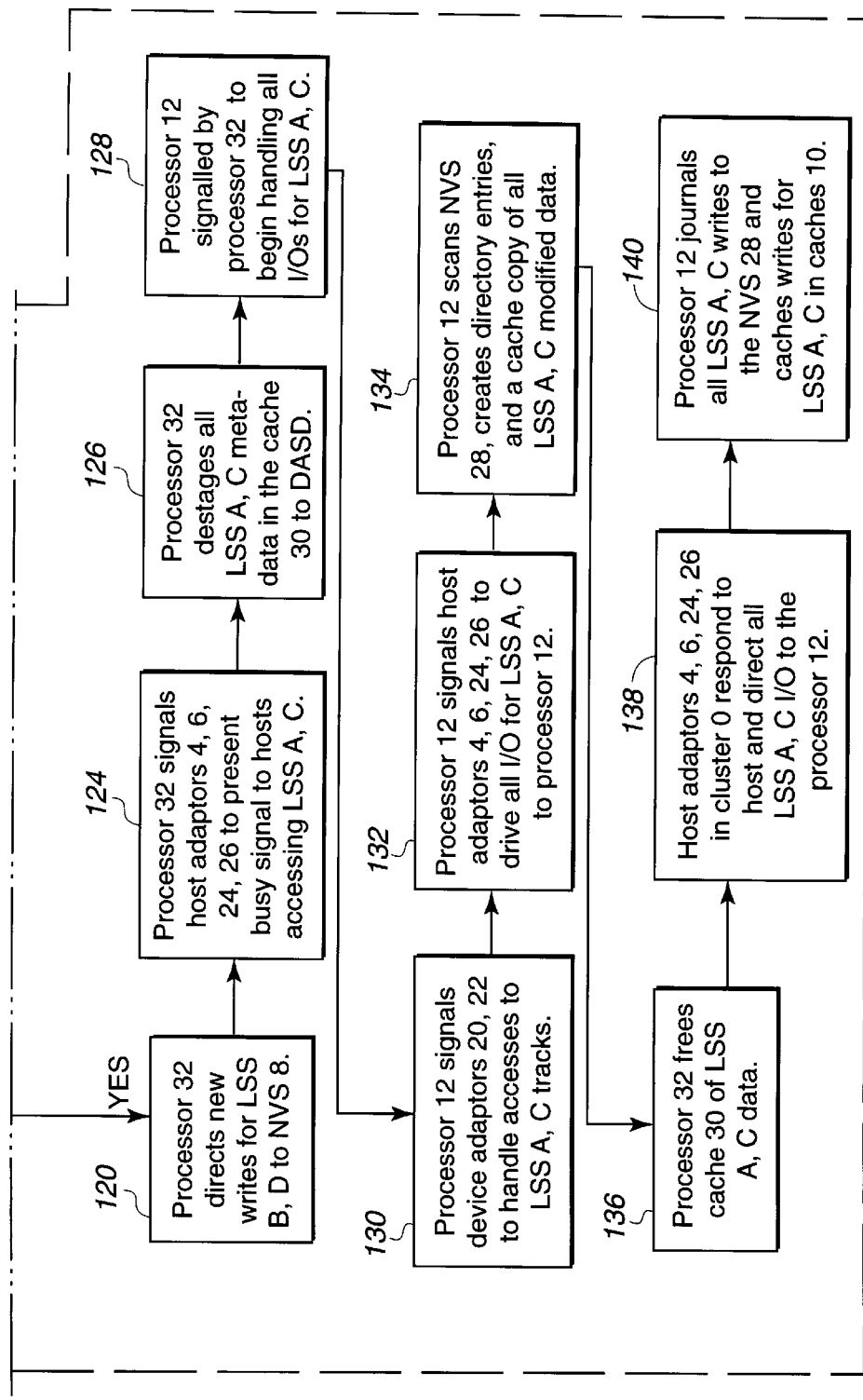

FIGS. 4 and 6 are flowcharts illustrating the logic used to control failover and failback, i.e., recovery, operations, respectively. Such logic may be implemented in the firmware of the processors 12, 32 and other devices embedded with processors within the storage controller 2 or as hardware logic (e.g., circuits and gates) throughout the storage controller 2. Those skilled in the art will recognize that this logic is provided for illustrative purposes only and that different logic may be used to accomplish the same results. FIGS. 5a, 5b, 7a, 7b, 8a, and 8b are block diagrams illustrating how the components of the storage controller 2 interact during failover and failback operations.

FIG. 4 illustrates an embodiment of logic for handling a failure of an entire cluster, which in FIG. 4 involves a failure of cluster 0. An entire cluster fails when either the processor 12, 32 and/or the NVS 8, 28 fails. The description of the failover handling with respect to cluster 0 would equally apply to a failure in cluster 1. Block 70 represents the failure of cluster 0, which occurs when either the processor 12 and/or the NVS 8 in cluster 0 fails. When cluster 0 fails, all unmodified LSS A, C data not written to NVS 28 is lost. Control transfers to block 72 which represents the host adaptors 4, 6, 24, 26 delaying or ceasing to respond to their attached hosts until the failover is completed. Control transfers to block 74 which represents the processor 32 taking over writes to the LSS A, C tracks previously handled by processor 12 in cluster 0. In preferred embodiments, the processors 32 would signal host adaptors 4, 6, 24, 26 and the host adaptors 4, 6, 24, 26 would redirect LSS A, C track requests to processor 32.

Control then transfers to block 76 which represents the processor 32 signaling the device adaptors 36, 38 in cluster 1 to handle all accesses to LSS A, C tracks. Control transfers to block 78 which represents the host adaptors 4, 6, 24, 26 presenting busy signals to all attached host systems accessing LSS A, B, C, D. Control transfers to blocks 80 and 82 which represents the processor 32 destaging all modified LSS B, D data in the cache 30 to the DASD via the device adaptors 36, 38 handling LSS B, D. Control transfers to block 84 which represents the processor 32 creating directory entries in cache 30 for data in NVS 28 and copying modified LSS A, C data in NVS 28 to the cache 30. This is to cache a redundant copy of modified data in the NVS 28 in case of a subsequent failure of either the NVS 28 or cache 30. Control transfers to block 86 which represents the processor 32 adjusting settings so all LSS B, D backups from cache 30 go to NVS 28, whereas previously they were directed to NVS 8 in cluster 0. After destaging of LSS B, D data from the cache 30 is complete, control transfers to block 88 which represents the processor 32 signaling the host adaptors 4, 6, 24, 26 to respond to their respective hosts and direct all I/O operations for LSS A, B, C, D toward cluster 1 and processor 32. Thereafter, at block 90, all writes to LSS A, B, C, D are directed to cache 30 and backed-up in NVS 28. Any data subsequently written to tracks LSS A, C are directed through device adaptors 36, 38 (FIG. 3) in cluster 1.

FIG. 5a is a block diagram illustrating how the storage controller 2 initially responds to a failure. The processor 12, NVS 8, and device adaptors 20, 22, and cache 10 in cluster 0 are down. FIG. 5a illustrates the processor 32 copying the modified LSS A, C data from the NVS 28 to the cache 30 as described at block 84 in FIG. 4. FIG. 5a further illustrates the processor 32 destaging LSS B, D data in the cache 30 to the LSS B, D tracks in the DASD via device adaptors 36, 38.

FIG. 5b is a block diagram illustrating how the processor 32 handles I/O operations for LSS A, B, C, D in failover mode after data is destaged at blocks 70–86 in FIG. 4. All writes to LSS A, B, C, D tracks are written to cache 30 and a back-up copy of all modified LSS A, B, C, D tracks are maintained in NVS 28, which in failover mode is controlled by processor 32.

In alternative embodiments of FIG. 4, the destage process can be delayed to immediately respond to and process host requests. In such case, at block 82 instead of waiting for the device adaptors 36, 38 to destage the data to the DASDs, the destage to DASD is scheduled and the processor 32 immediately proceeds to block 88 to handle host I/O requests to LSS B, D. In this alternative embodiment, block 88 would be modified such that the host adaptors 4, 6 would not wait for destaging to complete to direct host requests to cluster 1. While host requests are directed toward cluster 1, the device adaptors 36, 38 will continue writing the LSS B, D data from the cache 30 to the DASDs. In further embodiments, the device adaptors 36, 38 would include their own NVS to store the LSS B, D to be destaged. As a further precaution, the processor 32 could mark the modified LSS B, D data in the NVS 28 in case of a failure in the cache 30. The modified LSS B, D is marked by placing the track identification for the modified LSS B, D data in the NVS 28 which identifies which tracks in LSS B, D have been modified. In case of a failure to the cache 30, the marked tracks could be used to determine which modified LSS B, D data was lost. This alternative method reduces the added security of completely destaging modified LSS B, D data to the DASDs in return for a more immediate return to handling requests from the host.

FIG. 6 is a flowchart illustrating the failback process when cluster 0 is repaired and is ready to return to handle input/output requests to LSS A, C. As with the failover process, the description of the failback handling with respect to cluster 0 would equally apply to failback of cluster 1. At block 100, the failure in cluster 0 that led to the failover is repaired, rendering cluster 0 ready for I/O operations for LSS A, C. Control transfers to block 102 which represents processor 32 formatting NVS 8 as empty and assigning NVS 8 to processor 32. Control transfers to block 104 which represents the processor 32 destaging the LSS B, D data written in NVS 28 during failover mode to the DASD via device adaptors 36, 38. Control transfers to block 106 which represents the processor 32 signaling to stop cache fast writes to LSS A, C to the cache 30. Instead, writes to LSS A, C are DASD fast written to both cache 30 and NVS 28. Control then transfers to block 108 which represents the processor 32 scanning cache 30 for any writes to LSS A, C during failover mode and destaging all cache fast writes of LSS A, C in the cache 30 and destaging DASD fast writes of LSS B, D in NVS 28 to the DASD via device adaptors 36, 38 (FIG. 3).

Control transfers to block 110 which is a decision block representing the processor 32 determining whether a host has attempted to write to LSS B, D while the destaging of LSS B, D tracks from the NVS 28 is in progress. If so, control transfers to block 112; otherwise, control transfers to block 118. Block 112 is a decision block representing the processor 32 determining whether the write is for previously modified LSS B, D data stored in the NVS 28. If so, control transfers to block 114; otherwise, control transfers to block 116. Block 114 represents the processor 32 scheduling the modified LSS B, D data that the host is attempting to update in the NVS 28 for an immediate destage to DASD. After the destage of the LSS B, D modified data from the NVS 28, the LSS B, D data involved in the write is now unmodified. If the data written is unmodified, control transfers to block 116 which represents the processor 32 storing the unmodified data in the cache 30 and journaling the cache in the NVS 8 in cluster 0. From block 116 control transfers to block 118 which is a decision block representing the processor 32 determining whether the activity scheduled for block 108 is complete. If so, control transfers to block 120; otherwise control transfers back to block 110. After the destage is complete, there is neither cache fast write data for LSS A, C existing in the cache 30 nor is there LSS B, D data in the NVS 28.

After destaging all LSS B, D data from the NVS 28, control transfers to block 120 which represents the processor 32 directing all new writes to LSS B, D to NVS 8. Control transfers to block 124 which represents the processor 32 signaling host adaptors 4, 6, 24, 26 to present busy signals to all hosts accessing LSS A, C tracks. Control transfers to block 126 which represents the processor 32 destaging all LSS A, C metadata in the cache 30 to the DASDs via device adaptors 36, 38. Control then transfers to block 128 which represents the processor 32 signaling processor 12 in cluster 0 to begin handling all I/Os for LSS A, C. Control transfers to block 130 which represents processor 12 signaling the device adaptors 20, 22 to route all LSS A, C operations to cluster 0. Control transfers to block 132 which represents the processor 12 signaling the host adaptors to drive all LSS A, C data to processor 12. Control transfers to block 134 which represents the processor 12 scanning the NVS 28 to create directory entries and copy all modified LSS A, C data in NVS 28 to cache 10 Control then transfers to block 136, which represents the processor 32 freeing all space in cache 30 of any LSS A, C data. When the space is freed, all unmodified LSS A, C data is lost and the modified LSS A, C data is maintained in cache 10 and NVS 28. Control transfers to block 138 which represents the host adaptors 4, 6, 24, 26 responding to the hosts to direct all LSS A, C writes to the processor 12 in cluster 0. At block 140, the processor 12 begins journaling all LSS A, C writes to the NVS 28 and caching all writes to LSS A, C in cache 10.

Figure 7A:
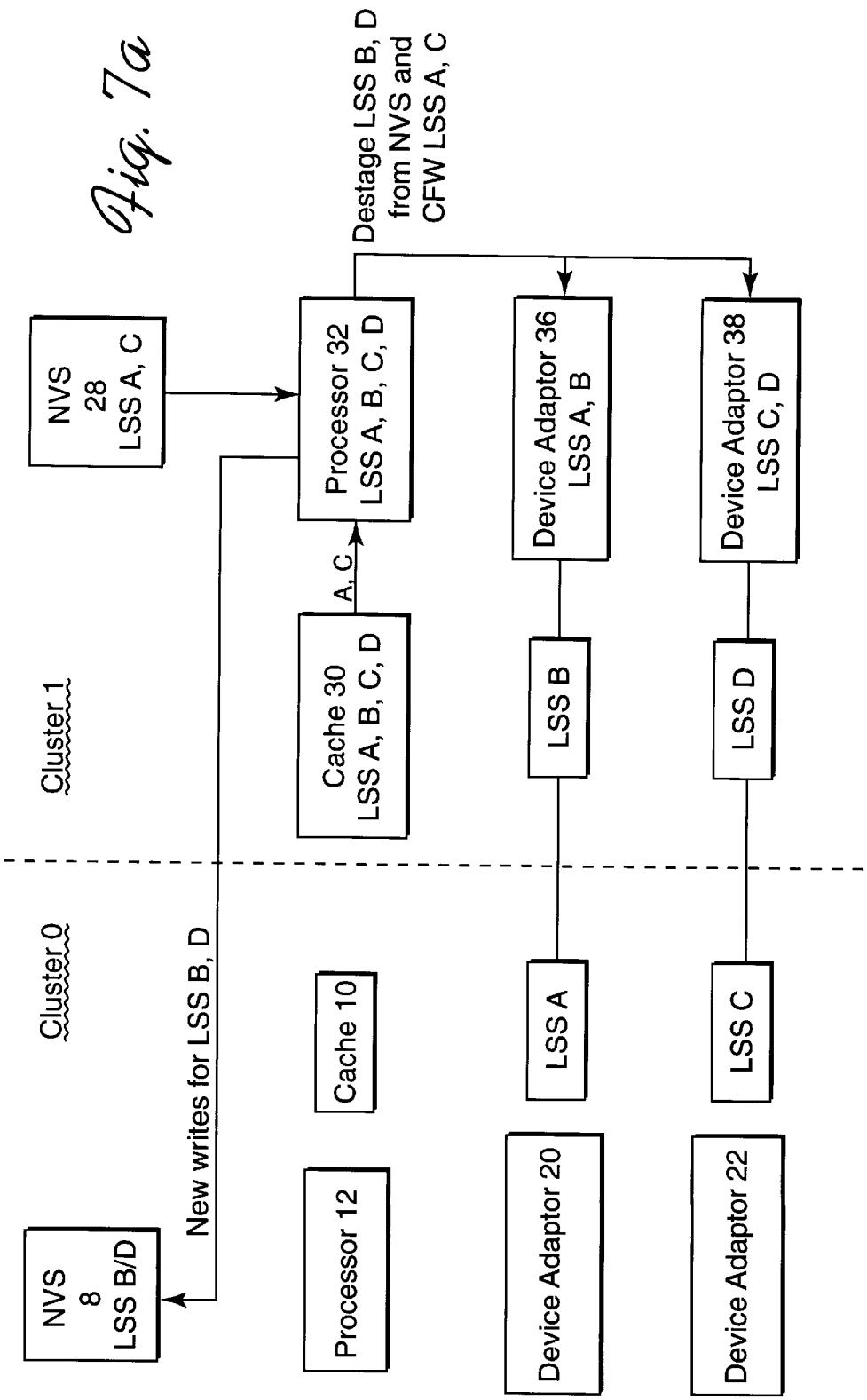
FIGS. 7a and 7b are block diagrams illustrating the storage controller embodiment of FIG. 1 performing failback operations after the failed hardware component has been repaired in accordance with the preferred logic illustrated in FIG. 6.

FIG. 7a is a block diagram illustrating the first part of the failback process at blocks 100–120 where all LSS A, B, C, D requests are routed to processor 32. The block diagram of FIG. 7a shows the LSS B, D destaged from NVS 28, leaving only LSS A, C tracks in NVS 28. Further, LSS A, C data written in cache 30 is destaged to DASD, leaving the LSS B, D in cache 30. New writes for LSS B, D are backed-up in NVS 8. Afterwards, there is neither cache fast write data for LSS A, C existing exclusively in cache 30, nor is there any LSS B, D in NVS 28.

Figure 7B:
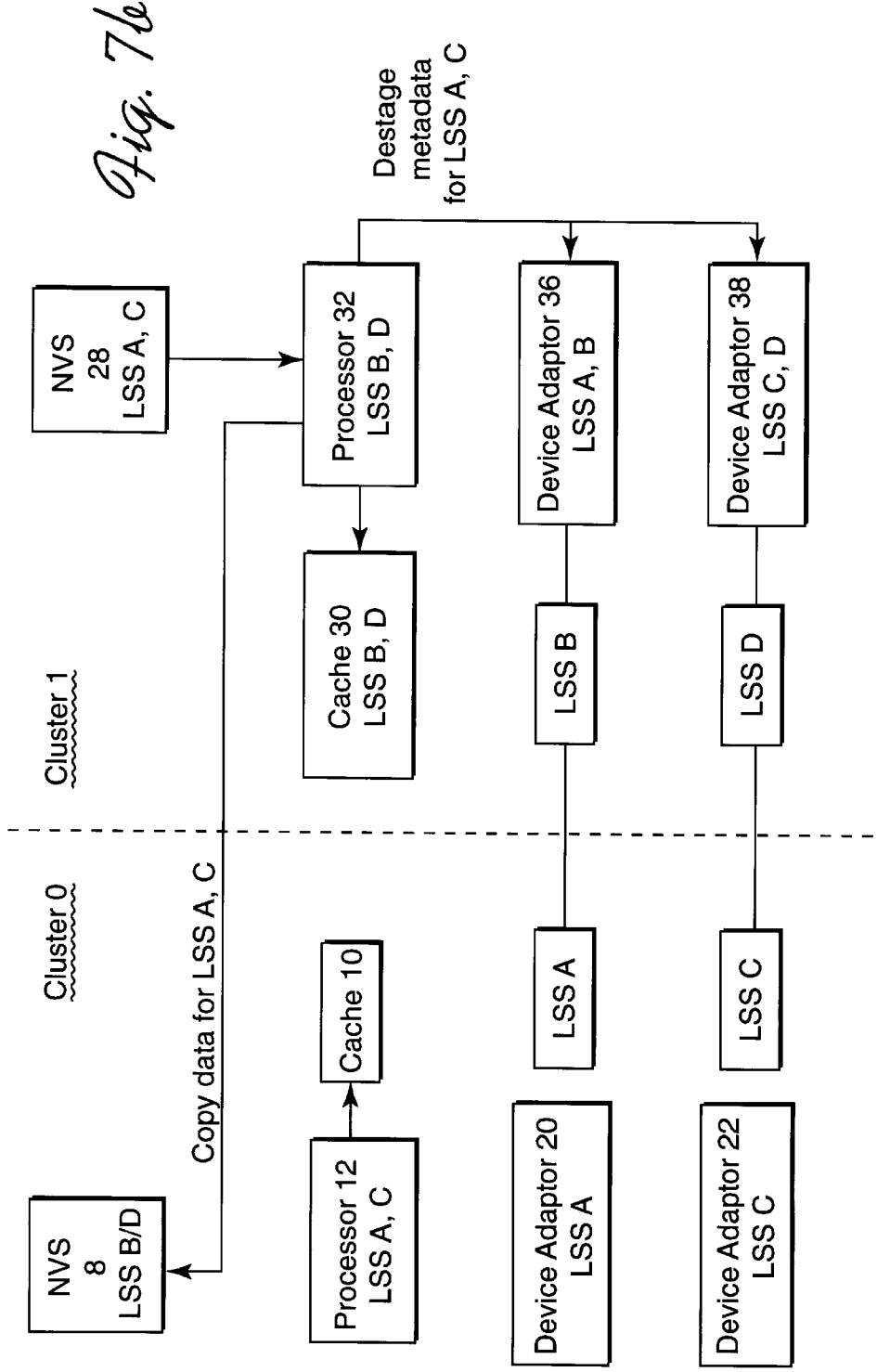

FIG. 7b is a block diagram illustrating the second part of the failback process at blocks 124–140 where processor 12 in cluster 0 comes back on-line. The processor 12 copies the modified LSS A, C data from the NVS 28 into the cache 10 and reasserts control over the device adaptors 20, 22 to access LSS A, C. After cluster 0 comes back on-line, writes to LSS A, B, C, D tracks are handled as shown in FIG. 3.

The above failover and fallback processes described with respect to FIGS. 4–7 are intended to handle any failure of one of the processors 12, 32 and/or one NVS 8, 28 in a single cluster. The above process is especially suited for systems where the processor 12, 32 in the cluster with a failed NVS 8, 28 cannot share access to the NVS 8, 28 in the active cluster. Moreover, the above described failover and failback processes may apply when cross cluster communication has failed. When cross cluster communication fails, an entire cluster can be taken down and a single cluster can be used to handle all I/O operations to the DASD.

Figure 8A:
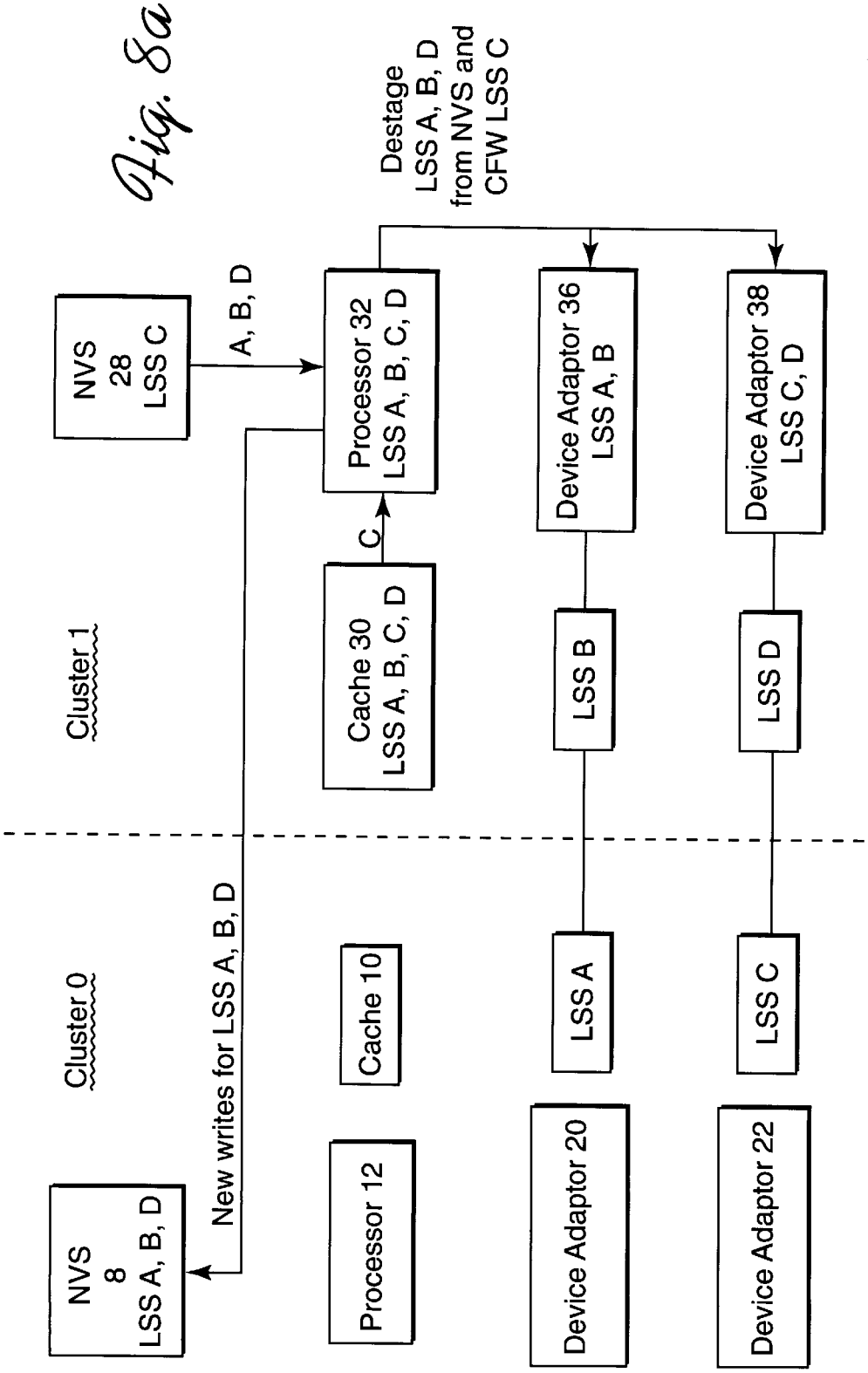
FIGS. 8a and 8b are block diagrams illustrating the storage controller embodiment of FIG. 1 performing failback operations when a device adaptor has failed.
Figure 8B:
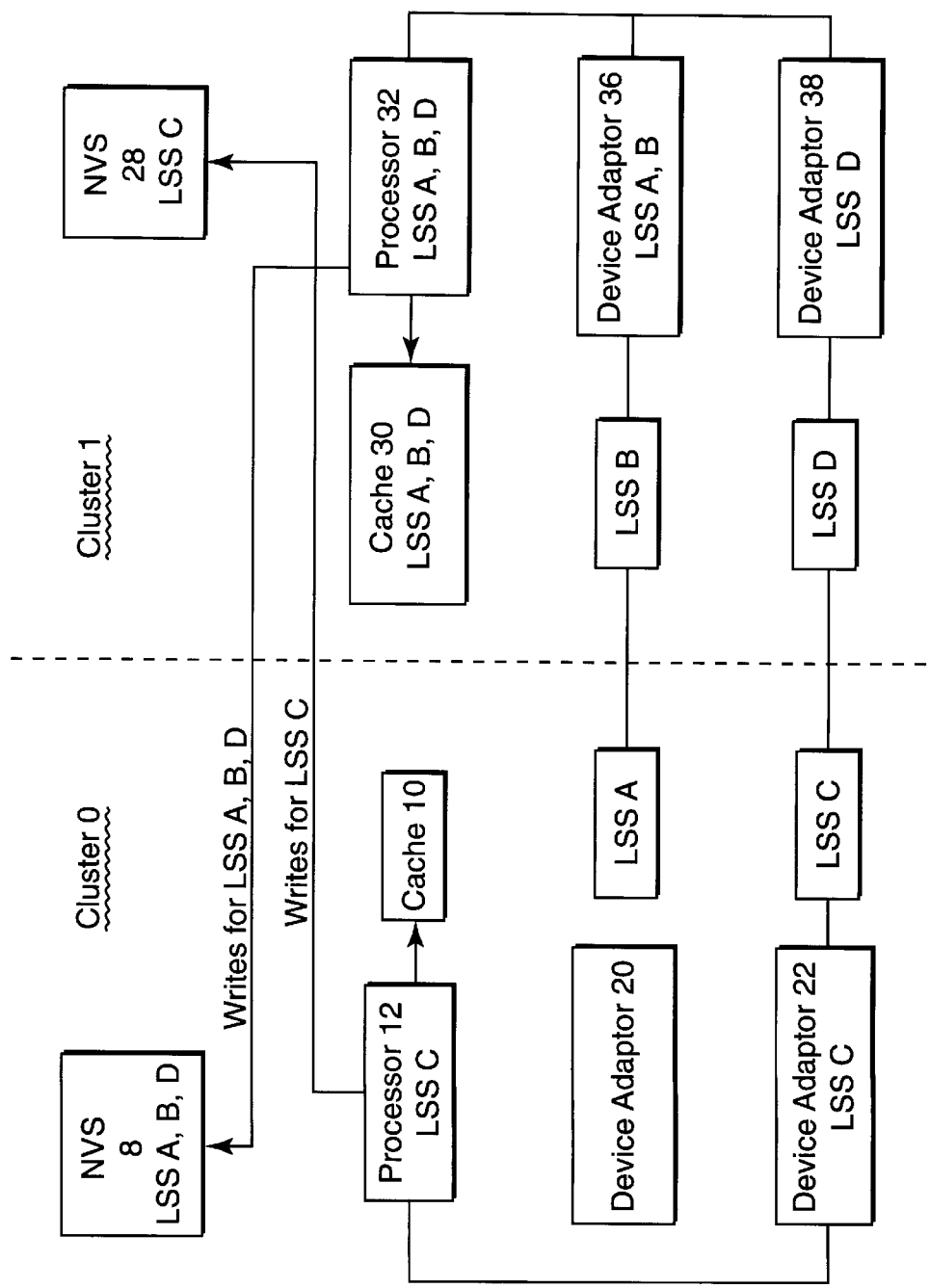

In preferred embodiments, if a device adaptor fails, then failover can be handled in the manner described with respect to FIGS. 4, 5a, and 5b as if the entire cluster including the failed device adaptor failed. FIGS. 8a and 8b are block diagrams illustrating how the failback for a failed device adaptor is handled. In the exemplar of FIGS. 8a, b, the device adaptor 30 failed and during failover (not shown), the entire cluster 0 was taken down. After failover, writes to LSS A, B, C, D are handled by the processor 32 in the second cluster 1. The failback process for a failed device adaptor 20 is the same as the failback process for a cluster as described with respect to FIG. 6 except with respect to how writes of LSS A data, initially handled by the failed device adaptor 20, are handled and routed to cluster 1. FIG. 8a illustrates the initial stage of the failback operation with the failed device adaptor 22. FIG. 8a shows the processor 32 destaging all LSS A, B, D data from NVS 28 and LSS C data from the cache 30 to DASD via device adaptors 36, 38. After destaging, all new writes to LSS A, B, D are handled by processor 32 and backed-up in NVS 8, leaving NVS 28 to handle back-ups for data writes to LSS C.

FIG. 8b is a block diagram illustrating the second part of the failback process with a failed device adaptor, and processor 12 handling writes to LSS C, and processor 32 and device adaptors 36, 38 handling writes to LSS A, B, D. Device adaptor 36 handles data writes to tracks LSS A, B as device adaptor 20 is down and can no longer write to LSS A. FIG. 8b shows the final status of how the tracks are handled when a device adaptor 20 fails. Thus, the failover process for a failed device adaptor is similar to the failback process for an entire cluster described with respect to FIG. 6, except that only the LSSs associated with the functioning device adaptor 22 failback, leaving the functioning device adaptor 36 in another cluster 1 to handle LSS A operations previously handled by the failed device adaptor 20 in cluster 0.

Conclusion

This concludes the description of the preferred embodiments of the invention. The following describes some alternative embodiments for accomplishing the present invention.

Preferred embodiments of the failover and failback systems are described with respect to a storage controller having a specific two cluster arrangement. However, those skilled in the art will recognize that the failover and failback procedures could apply to storage controllers having different components and a different architecture from the storage controller described with respect to FIG. 1. For instance, the storage controller may include additional clusters, a different interface arrangement between the host adaptors and the processor and between the processor and the device adaptors. Still further, a different arrangement and/or number of host adaptors, device adaptors, processors, DASDs, LSS tracks, etc., could be used.

Still further, the DASDs are described as being magnetic units. However, in alternative embodiments the DASDs could be optical memory devices, tape drives, holographic units, etc. Yet further, the DASDs could be organized into a plurality of RAID array structures. Still further, the components of the storage controller 2, including the clusters 0, 1, host adaptors 4, 6, 24, 26, host adaptor bridge 44, NVS 8, 28, processors 12, 32, cache 30, device adaptor bus 14, 34, and device adaptors 16, 18, 20, 22, 36, 38, 40, 42 and functions performed thereby may be implemented with hardware logic (e.g., gates and circuits), firmware or a combination thereof. Moreover, events may occur at times different than order presented in the flowcharts of FIGS. 4 and 6.

In summary preferred embodiments in accordance with the present invention provide a system for handling failures in a storage controller interfacing between a plurality of host systems and direct access storage devices (DASDs). The storage controller directs data from the host systems through a first and second data paths in the storage controller to a DASD. A first processor, first non-volatile memory unit (NVS), and a first cache are associated with the first data path and a second processor, a second NVS, and a second cache are associated with the second data path. A bridge provides communication between the first processor and the second NVS and the second processor and the first NVS. During normal operations prior to a failure in the storage controller, data directed to the first data path is written in the first cache and communicated with the first processor to the second NVS via the bridge for storage in the second NVS. Data directed to the second data path is written in the second cache and communicated with the second processor to the first NVS via the bridge for storage in the first NVS. A point of failure within at least one of the first processor, first cache, and first NVS is handled by routing the data directed to the first data path to the second processor and writing the routed data to the second cache and the second NVS. Upon repairing the point of failure, the data directed to the first data path is routed to the first processor, wherein the routed data is written in the first cache and communicated with the first processor to the second NVS via the bridge for storage therein.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for handling failures in a storage controller interfacing between a plurality of host systems and direct access storage devices (DASDs), comprising the steps of:

(a) directing data from the host systems through a first and second data paths in the storage controller to a DASD, wherein a first processor, first non-volatile memory unit (NVS), and a first cache are associated with the first data path, wherein a second processor, a second NVS, and a second cache are associated with the second data path, and wherein a bridge provides communication between the first processor and the second NVS and the second processor and the first NVS, comprising the steps of:

(1) writing data directed toward the first data path in the first cache;

(2) communicating with the first processor data directed toward the first data path to the second NVS via the bridge for storage in the second NVS;

(3) writing data directed toward the second data path in the second cache;

(4) communicating with the second processor data directed toward the second data path to the first NVS via the bridge for storage in the first NVS;

(b) handling a point of failure within at least one of the first processor, first cache, and first NVS, comprising the steps of routing data directed toward the first data path to the second processor and writing the routed data to the second cache and the second NVS; and (c) rerouting data directed to the first data path to the first processor upon repairing the point of failure, wherein the rerouted data is written in the first cache and communicated with the first processor to the second NVS via the bridge for storage therein.

2. The method of claim 1, wherein data is written to the first NVS when the data is to be written to the DASD and the data is present in the second cache, and wherein data is written to the second NVS when the data is to be written to the DASD and the data is present in the first cache.

3. The method of claim 1, wherein the step of handling a failure further comprises the steps of:

destaging the data in the second cache to the DASD; and
    copying the data in the second NVS to the second cache.

4. The method of claim 1, wherein the step of rerouting data directed to the first data path upon repairing the point of failure further comprises the steps of:

destaging data directed to the second data path that was written to the second NVS during failure handling to the DASD;

destaging data that was routed from the first data path to the second processor and written to the second cache during failure handling to the DASD; and copying data that was routed from the first data path to the second processor and written to the second NVS during failure handling to the first cache.

5. The method of claim 1, wherein the step of directing data from the host systems through the first and second data paths further comprises the steps of directing data from the first processor to a first device adaptor which accesses a DASD within a group of DASDs and directing data from the second processor to a second device adaptor which accesses a DASD within the group of DASDs, and wherein the step of routing data from the first data path to the second processor during failure handling further comprises writing the routed data to a DASD via the second device adaptor.

6. The method of claim 5, wherein there are at least two groups of DASDs and at least two first device adaptors interfacing the first processor with the DASDs and at least two second device adaptors interfacing the second processor with the DASDs, wherein each group of DASDs has a first and second device adaptor attached thereto, wherein a first group of DASDs includes a first and second logical subsystems and wherein a second group of DASDs includes a third and fourth logical subsystems, wherein the step of directing data through the first and second data paths prior to failure further comprises the steps of:

(1) directing data directed to the first logical subsystem through the first data channel to the first group of DASDs via one of the first device adaptors;

(2) directing data directed to the second logical subsystem through the second data channel to the first group of DASDs via one of the second device adaptors;

(3) directing data directed to the third logical subsystem through the first data channel to the second group of DASDs via one of the first device adaptors; and (4) directing data directed to the fourth logical subsystem through the second data channel to the second group of DASDs via one of the second device adaptors.

7. The method of claim 6, wherein the step of routing data directed to the first data path to the second processor in the event of a point of failure further comprises the steps of:

routing data directed to the first logical subsystem to one of the second device adaptors attached to the first group of DASDs, wherein the second device adaptor writes the routed data to the first logical subsystem; and routing data directed to the third logical subsystem to one of the second device adaptors attached to the first group of DASDs, wherein the second device adaptor writes the routed data to the third logical subsystem.

8. The method of claim 7, wherein the point of failure occurs in the first device adaptor linked to the first logical subsystem, and wherein the step of rerouting data directed to the first data path to the first processor comprises the steps of routing data directed to the first, second, and fourth logical subsystems to the second processor and second device adaptors and routing data directed to the third logical subsystem to the first processor and a first device adaptor.

9. The method of claim 8, wherein the step of rerouting the data directed to the first data path to the first processor further comprises:

destaging data directed to the first, second, and fourth logical subsystems that was written to the second NVS during failure handling to the DASD;

destaging data directed to the third logical subsystem that was routed from the first data path to the second processor and written to the second cache during failure handling to the DASD; and copying data directed to the third logical subsystem that was routed from the first data path to the second processor and written to the second NVS during failure handling to the first cache.

10. A storage controller for interfacing between a plurality of host systems and direct access storage devices (DASDs), wherein data is transferred between the host systems and a first and second locations in the DASDs, comprising:

(a) a first cluster, including a first processor, a first non-volatile memory unit (NVS), and a first cache;

(b) a second cluster, including a second processor, a second NVS, and a second cache;

(c) a bridge providing communication between the first processor and the second NVS and the second processor and the first NVS, wherein data directed toward the first location is directed toward the first processor and written in the first cache and the second NVS, and wherein data directed to the second location is directed toward the second processor and written in the second cache and the first NVS;

(d) means, performed by the second processor, for detecting a failure in the first cluster;

(e) means for routing data directed toward the first location to the second processor and writing the routed data to the second cache and the second NVS in response to detecting a failure within the first cluster; and (f) means for rerouting data directed toward the first location to the first processor upon repairing the failure in the first cluster, wherein the rerouted data is written in the first cache and the second NVS via the bridge.

11. The storage controller of claim 10, wherein data is written to the first NVS when the data is to be written to the DASD and the data is present in the second cache, and wherein data is written to the second NVS when the data is to be written to the DASD and the data is present in the first cache.

12. The storage controller of claim 10, wherein the means for routing data in response to detecting a failure further includes:

means, performed by the second processor, for destaging the data in the second cache to the DASD; and means, performed by the second processor, for copying the data in the second NVS to the second cache.

13. The storage controller of claim 10, wherein the step of rerouting data directed to the first location upon repairing the failure in the first cluster further comprises:

means, performed by the second processor, for destaging data directed to the second location that was written to the second NVS during failure handling to the DASD;

means, performed by the second processor, for destaging data that was routed to the second processor and written to the second cache during failure handling to the DASD; and means for copying data that was routed from the first data path to the second processor and written to the second NVS during failure handling to the first cache.

14. The storage controller of claim 10, further including:

a group of DASDs including the first and second locations;

a first device adaptor interfacing between the first processor and the group of DASDs, wherein data directed to the first location is directed by the first processor to the first device adaptor which writes the data to the first location; and a second device adaptor interfacing between the second processor and the group of DASDs, wherein the data directed to the second location is directed by the second processor to the second device adaptor which writes the data to the second location, and wherein the second device adaptor writes the data directed to the first location to the first location within the group of DASDs when the data directed to the first location is routed to the second processor.

15. The storage controller of claim 14, further composing:

a second group of DASDs including a third and fourth location therein;

at least one more first device adaptor interfacing between the second group of DASDs and the first processor, wherein data directed to the third location is directed by the first processor to the first device adaptor attached to the second group of DASDs; and at least one more second device adaptor interfacing between the second group of DASDs and the second processor, wherein data directed to the fourth location is directed by the second processor to the second device adaptor attached to the second group of DASDs, and wherein the second adaptor writes data directed to the third location to the third location when the data directed to the third location is routed to the second processor upon failure detection.

16. The storage controller of claim 15, wherein the failure occurs in the first device adaptor linked to the first location, and wherein the step of routing data directed to the first location to the second processor comprises the steps of routing data directed to the first, second, and fourth logical subsystems to the second processor and second device adaptors and routing data directed to the third location to the first processor and a first device adaptor.

17. The storage controller of claim 16, wherein the means for rerouting the data directed to the first location to the first processor further comprises:

means, performed by the second processor, for destaging data directed to the first, second, and fourth locations that was written to the second NVS during failure handling to the DASDs;

means, performed by the second processor, for destaging data directed to the third location that was routed to the second processor and written to the second cache during failure handling to the DASD; and means for copying data directed to the third location that was routed from the first data path to the second processor and written to the second NVS during failure handling to the first cache.

18. An article of manufacture for use in programming a storage controller to direct data between host systems and direct access storage devices (DASDs), the article of manufacture comprising a storage medium having logic embodied therein that causes components of the storage controller to perform the steps of:

(a) directing data from the host systems through a first and second data paths in the storage controller to a DASD, wherein the first processor, a first non-volatile memory unit (NVS), and a first cache are associated with the first data path, wherein the second processor, a second NVS, and a second cache are associated with the second data path, and wherein a bridge provides communication between the first processor and the second NVS and the second processor and the first NVS, comprising the steps of:

(1) writing data directed toward the first data path in the first cache;

(2) communicating with the first processor data directed toward the first data path to the second NVS via the bridge for storage in the second NVS;

(3) writing data directed toward the second data path in the second cache;

(4) communicating with the second processor data directed toward the second data path to the first NVS via the bridge for storage in the first NVS;

(b) handling a point of failure within at least one of the first processor, first cache, and first NVS, comprising the steps of routing data directed toward the first data path to the second processor and writing the routed data to the second cache and the second NVS; and (d) rerouting data directed to the first data path to the first processor upon repairing the point of failure, wherein the routed data is written in the first cache and communicated with the first processor to the second NVS via the bridge for storage therein.

19. The article of manufacture of claim 18, wherein data is written to the first NVS when the data is to be written to the DASD and the data is present in the second cache, and wherein data is written to the second NVS when the data is to be written to the DASD and the data is present in the first cache.

20. The article of manufacture of claim 18, wherein the step of handling a point of failure further comprises the steps of:

destaging with the second processor the data in the second cache to the DASD; and copying with the second processor the data in the second NVS to the second cache.

21. The article of manufacture of claim 18, wherein the step of rerouting data directed to the first data path upon repairing the point of failure further comprises the steps of:

destaging with the second processor data directed to the second data path that was written to the second NVS during failure handling to the DASD;

destaging with the second processor data that was routed from the first data path to the second processor and written to the second cache during failure handling to the DASD; and copying data that was routed from the first data path to the second processor and written to the second NVS during failure handling to the first cache.

22. The article of manufacture of 18, wherein the step of directing data from the host systems through the first and second data paths further comprises the steps of directing data from the first processor to a first device adaptor which accesses a DASD within a group of DASDs and directing data from the second processor to a second device adaptor which accesses a DASD within a group of DASDs, wherein the first device adaptor and the second device adaptor are attached to the group of DASDs to access data locations therein, and wherein the step of routing data from the first data path to the second processor during failure handling further comprises writing the routed data to a DASD via the second device adaptor.

23. The article of manufacture of claim 22, wherein there are at least two groups of DASDs, and at least two first device adaptors and second device adaptors, wherein at least one of the first device adaptors and one of the second device adaptors are attached to each group of DASDs, wherein a first group of DASDs includes a first and second logical subsystems and wherein a second group of DASDs includes a third and fourth logical subsystems, wherein the step of directing data through the first and second data paths prior to failure further comprises the steps of:

(1) directing data directed to the first logical subsystem through the first data channel to the first group of DASDs via one of the first device adaptors;

(2) directing data directed to the second logical subsystem through the second data channel to the first group of DASDs via one of the second device adaptors;

(3) directing data directed to the third logical subsystem through the first data channel to the second group of DASDs via one of the first device adaptors; and (4) directing data directed to the fourth logical subsystem through the second data channel to the second group of DASDs via one of the second device adaptors.

24. The article of manufacture of claim 23, wherein the step of routing data directed to the first data path to the second processor in the event of a point of failure further comprises the steps of:

routing data directed to the first logical subsystem to one of the second device adaptors attached to the first group of DASDs, wherein the second device adaptor writes the routed data to the first logical subsystem; and routing data directed to the third logical subsystem to one of the second device adaptors attached to the first group of DASDs, wherein the second device adaptor writes the routed data to the third logical subsystem.

25. The article of manufacture of 24, wherein the point of failure occurs in the first device adaptor linked to the first logical subsystem, and wherein the step of routing data directed to the first data path to the second processor comprises the steps of routing data directed to the first, second, and fourth logical subsystems to the second processor and second device adaptors and routing data directed to the third logical subsystem to the first processor and a first device adaptor.

26. The article of manufacture of 25, wherein the step of rerouting the data directed to the first data path to the first processor further comprises:

destaging data directed to the first, second, and fourth logical subsystems that was written to the second NVS during failure handling to the DASD;

destaging data directed to the third logical subsystem that was routed from the first data path to the second processor and written to the second cache during failure handling to the DASD; and copying data directed to the third logical subsystem that was routed from the first data path to the second processor and written to the second NVS during failure handling to the first cache.

* * * * *

UNITED STATES PATENT AND TRADEMARK OFFICE
CERTIFICATE OF CORRECTION

PATENT NO.    : 6,006,342
DATED         : December 21, 1999
INVENTOR(S)   : Beardsley et al.

It is certified that error appears in the above-identified patent and that said Letters Patent is hereby corrected as shown below:

Column 1,
Line 52, delete "arc" and insert -- are --

Column 15,
Line 56, after "manufacture of" insert -- claim --

Column 16,
Lines 40 and 49, after "manufacture of" insert -- claim --

Signed and Sealed this

Fifth Day of August, 2003

JAMES E. ROGAN
*Director of the United States Patent and Trademark Office*